US011475737B1

(12) United States Patent
Baker

(10) Patent No.: US 11,475,737 B1
(45) Date of Patent: Oct. 18, 2022

(54) VIDEO POKER SYSTEM AND METHOD USING MULTIPLE UNIQUE DECKS HAVING FOUR OF A KIND AND ROYAL FLUSH BONUS HANDS

(71) Applicant: Kenneth Baker, Las Vegas, NV (US)

(72) Inventor: Kenneth Baker, Las Vegas, NV (US)

( * ) Notice: Subject to any disclaimer, the term of this patent is extended or adjusted under 35 U.S.C. 154(b) by 0 days.

(21) Appl. No.: 17/030,084

(22) Filed: Sep. 23, 2020

Related U.S. Application Data

(60) Provisional application No. 62/904,527, filed on Sep. 23, 2019.

(51) Int. Cl.
*G07F 17/32* (2006.01)
*A63F 13/00* (2014.01)
*A63F 1/00* (2006.01)

(52) U.S. Cl.
CPC ...... *G07F 17/3267* (2013.01); *G07F 17/3211* (2013.01); *G07F 17/3251* (2013.01); *G07F 17/3258* (2013.01); *G07F 17/3293* (2013.01)

(58) Field of Classification Search
CPC .. G07F 17/3293; A63F 1/00; A63F 2001/005; A63F 2001/008
See application file for complete search history.

(56) References Cited

U.S. PATENT DOCUMENTS 5,531,440 A * 7/1996 Dabrowski ............... A63F 1/00 273/292
6,227,969 B1 * 5/2001 Yoseloff .................... A63F 1/18 273/143 R
6,443,456 B1 * 9/2002 Gajor .................. A63F 3/00157 273/303
6,471,587 B1 * 10/2002 Wood ........................ A63F 1/00 273/143 R
6,511,068 B1 * 1/2003 Sklansky ............ A63F 3/00157 273/237
6,581,936 B1 * 6/2003 Zoccolillo ........... A63F 3/00157 273/274
7,614,946 B2 * 11/2009 Nicely ................ G07F 17/3293 273/274
7,753,767 B2 * 7/2010 Thomas .............. G07F 17/3293 463/11
7,758,410 B2 * 7/2010 Hughes ................... G07F 17/32 463/16
8,118,655 B1 * 2/2012 Maksymec ........... G07F 17/326 463/13
8,574,052 B1 * 11/2013 Nottke ................ G07F 17/3244 463/13
9,067,144 B1 * 6/2015 Nottke .................... A63F 13/45
9,550,109 B1 * 1/2017 Nottke .................... A63F 13/00
(Continued)

*Primary Examiner* — Milap Shah
(74) *Attorney, Agent, or Firm* — FisherBroyles, LLP; Rob L. Phillips

(57) ABSTRACT

A video poker system and method allow a player to play a primary game in a conventional fashion while seeking a bonus payout based on cards from the primary game poker hand and one or more secondary poker hands from separate decks of cards. Certain pre-established poker hands (e.g., 4s of a kind) formed using cards from the primary game poker hand and the one or more secondary poker hands provide bonus payouts. A bonus hand may comprise a royal flush hand made using one royal flush card from each of five secondary poker hands. The system and method increase player interest, player wagers and provide meaningful bonus payouts.

3 Claims, 8 Drawing Sheets

(56) References Cited

U.S. PATENT DOCUMENTS

| | | | | | |
|---|---|---|---|---|---|
| 2002/0034974 | A1* | 3/2002 | Wood | G07F 17/3244 | 463/13 |
| 2002/0149153 | A1* | 10/2002 | Wichinsky | A63F 1/00 | 273/292 |
| 2002/0153662 | A1* | 10/2002 | Webb | A63F 3/00157 | 273/292 |
| 2004/0033824 | A1* | 2/2004 | Fitzhugh | G07F 17/3244 | 463/13 |
| 2004/0132524 | A1* | 7/2004 | Ramstad | G07F 17/3258 | 463/16 |
| 2004/0214624 | A1* | 10/2004 | Moody | A63F 3/00157 | 463/13 |
| 2005/0173863 | A1* | 8/2005 | Walker | G07F 17/32 | 273/292 |
| 2006/0025190 | A1* | 2/2006 | Kraft | A63F 1/00 | 463/16 |
| 2006/0246980 | A1* | 11/2006 | Walker | G07F 17/32 | 463/13 |
| 2008/0237984 | A1* | 10/2008 | Kling | A63F 1/00 | 273/292 |
| 2009/0121435 | A1* | 5/2009 | Schultz | A63F 1/00 | 273/292 |
| 2010/0105467 | A1* | 4/2010 | Stone | G07F 17/32 | 463/22 |
| 2011/0117980 | A1* | 5/2011 | Parham | G07F 17/32 | 463/13 |
| 2018/0089949 | A1* | 3/2018 | Moody | G07F 17/3244 | |

* cited by examiner

VIDEO POKER SYSTEM AND METHOD USING MULTIPLE UNIQUE DECKS HAVING FOUR OF A KIND AND ROYAL FLUSH BONUS HANDS

CROSS-REFERENCE

This application claims priority to U.S. Patent Application No. 62/904,527 filed Sep. 23, 2019 which is incorporated herein for all purposes.

FIELD OF THE INVENTION

The embodiments of the present invention relate to a system and method for conducting video poker game.

BACKGROUND

Conventional video poker involves a simulated deck of 52 cards being shuffled until a player depresses a deal button. At that time, the deck is set (i.e., shuffling stops) and the top five cards in the shuffled deck are displayed face up on the gaming machine display. The player may then select which cards to hold and which to discard. Any discards are replaced by the next cards off the top of the shuffled deck. Depending on the rank of the final five cards, the player receives an award or no award. For example, in one embodiment, a final hand having a rank of a pair of Jacks or better results in an award.

While video poker is a very popular game, it does suffer from drawbacks. The game can become stale over time.

Accordingly, it would be advantageous to develop a video poker system and method permitting players to receive additional payouts for bonus hands that do not impact the underlying video poker game.

SUMMARY

The embodiments of the present invention allow the player to play a primary game in a conventional fashion while seeking a bonus payout based on cards from the primary game poker hand and one or more secondary poker hands from separate decks of cards. In one embodiment, certain pre-established poker hands (e.g., 4s of a kind) formed using cards from the primary game poker hand and said one or more secondary poker hands provide bonus payouts. In another embodiment, a bonus hand may comprise a royal flush made using one royal flush card from each of five secondary poker hands. The embodiments of the present invention increase player interest, player wagers and provides meaningful bonus payouts.

A first system embodiment of the present invention comprises: a display, memory, user interface, a bill and ticket validator configured to receive and dispense currency and/or tickets, and a processor; said processor running executable instructions to: (i) accept a wager via said user interface; (ii) display an initial five random cards from a first virtual deck of fifty-two playing cards; (iii) remove discards identified by said player via said user interface; (iv) replace said discards with successive random cards from said first virtual deck of fifty-two playing cards to form a final video poker hand; (v) display one or more secondary poker hands formed of random cards from one or more separate additional virtual decks of fifty-two playing cards, respectively; (vi) provide a payout, if warranted, based on a strength of said final primary poker hand; and (vii) provide a bonus payout based on a strength of each bonus hand formed of cards forming said final primary poker hand in combination with cards in each of said one or more secondary poker hands wherein a number of bonus hands is equivalent to a number of secondary poker hands.

In one such embodiment, a bonus payout is made responsive to any four of kind of all four suits resulting from said final video poker hand in combination with said one or more sets of five random cards from said one or more additional virtual decks of fifty-two playing cards. In another embodiment, with four additional hands, a bonus payout corresponds to obtaining a royal flush with one card of said royal flush coming from each hand (i.e., the primary hand and 4 additional hands).

Other variations, embodiments and features of the present invention will become evident from the following detailed description, drawings and claims.

DETAILED DESCRIPTION

Figure 1:
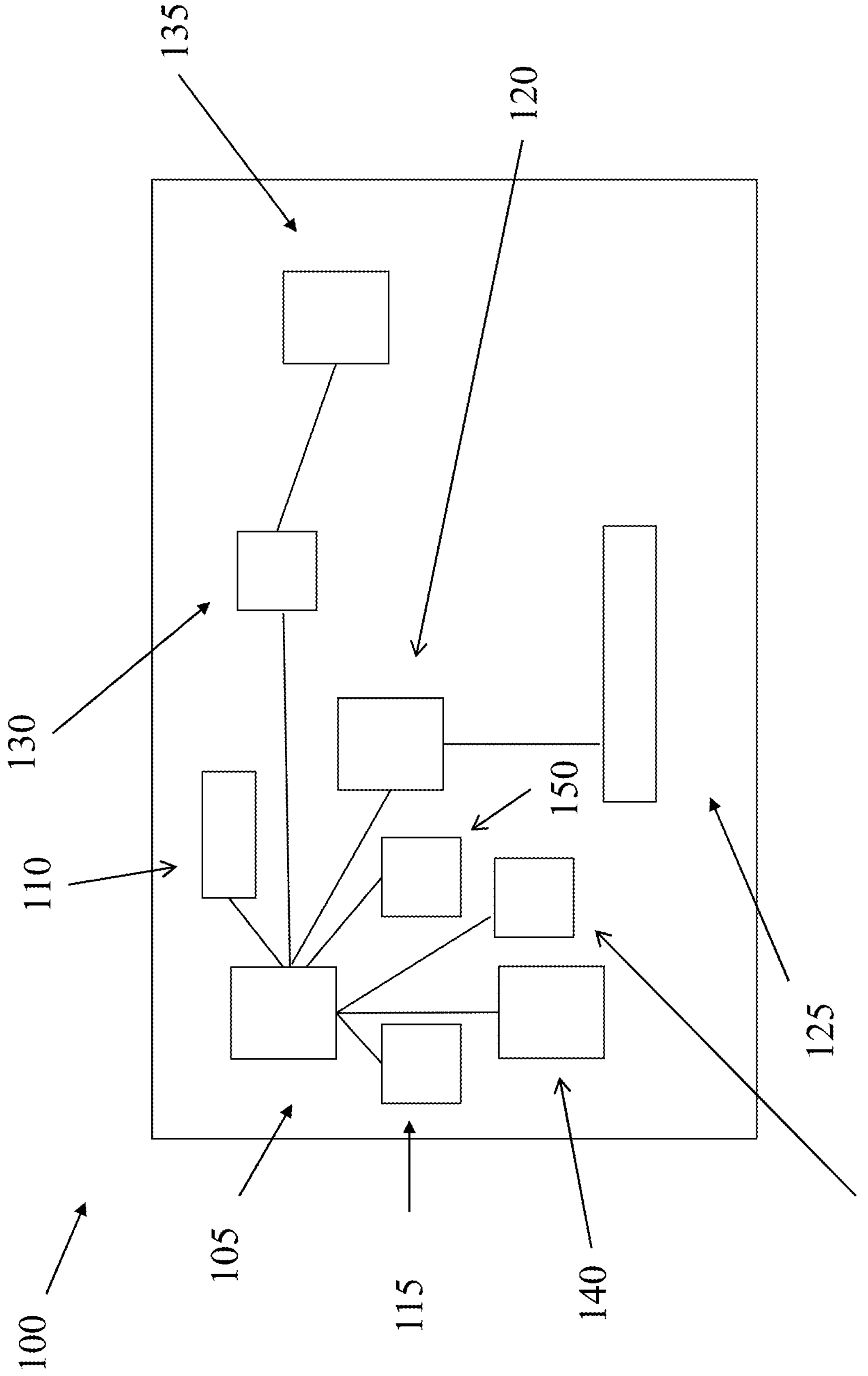
FIG. 1 illustrates a block diagram of components of an electronic gaming device for conducting a game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

As will be appreciated by one skilled in the art, the embodiments of the present invention combine software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for embodiments of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Mobile devices as used herein include desktop computers, laptop computers, tablets, smart phones and the like. The embodiments of the present invention may be implemented as a dedicated website and/or mobile application. The use of wager and wagering herein are synonymous with bet and betting.

The embodiments of the present invention relate to a video poker system and method facilitated by a video poker machine. Such video poker machines are well-known in the art so the operational details, other than those relevant hereto, need not be detailed herein. Video poker is a straightforward game that has been popular for decades. The object of the game is to obtain the highest ranking five-card poker hand with one draw opportunity. The game is played as follows: (i) a player makes a bet; (ii) the player inputs a deal instruction at which time a shuffling of virtual cards ceases and the 5 top cards from a deck of 52 virtual cards are presented face up on a video display; (iv) via an interface, the player has the option to discard one, two, three, four or five of the initial cards; (v) discards, if any, are replaced with the next cards off the virtual deck of playing cards; and (vi) payouts, if any, are based on the rank of the hand formed by the final five cards. Table 1 shows a standard pay table for a video poker game with payouts against $1-$5 bets. There are many alternative video poker pay tables but each of the pay tables is substantially the same with subtle nuances, including enhanced payouts for certain pre-established hands (e.g., four Aces with a 2, 3 or 4 kicker).

TABLE 1

| Hand Type | 5 coins | 4 coins | 3 coins | 2 coins | 1 coin |
|---|---|---|---|---|---|
| Royal Flush | $4000 | $1000 | $750 | $500 | $250 |
| Straight Flush | $250 | $200 | $150 | $100 | $50 |
| 4 of a Kind | $125 | $100 | $75 | $50 | $25 |
| Full House | $45 | $36 | $27 | $18 | $9 |
| Flush | $30 | $24 | $18 | $12 | $6 |
| Straight | $20 | $16 | $12 | $8 | $4 |
| 3 of a Kind | $15 | $12 | $9 | $6 | $3 |
| Two Pair | $10 | $8 | $6 | $4 | $2 |
| Jacks or Better Pair | $5 | $4 | $3 | $2 | $1 |

A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The components, and others, may be attached to a circuit board forming a motherboard. In another embodiment, the electronic gaming device 100 may be linked to a central game server which allows players to select from games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. Payout system 150 includes a coupon printer or similar device for receiving money/coupon from the electronic gaming device 100.

Those skilled in the art will recognize that the configuration and features of the electronic gaming device 100 disclosed herein are exemplary and may be altered in any number of ways without impacting the embodiments of the present invention.

Figure 2:
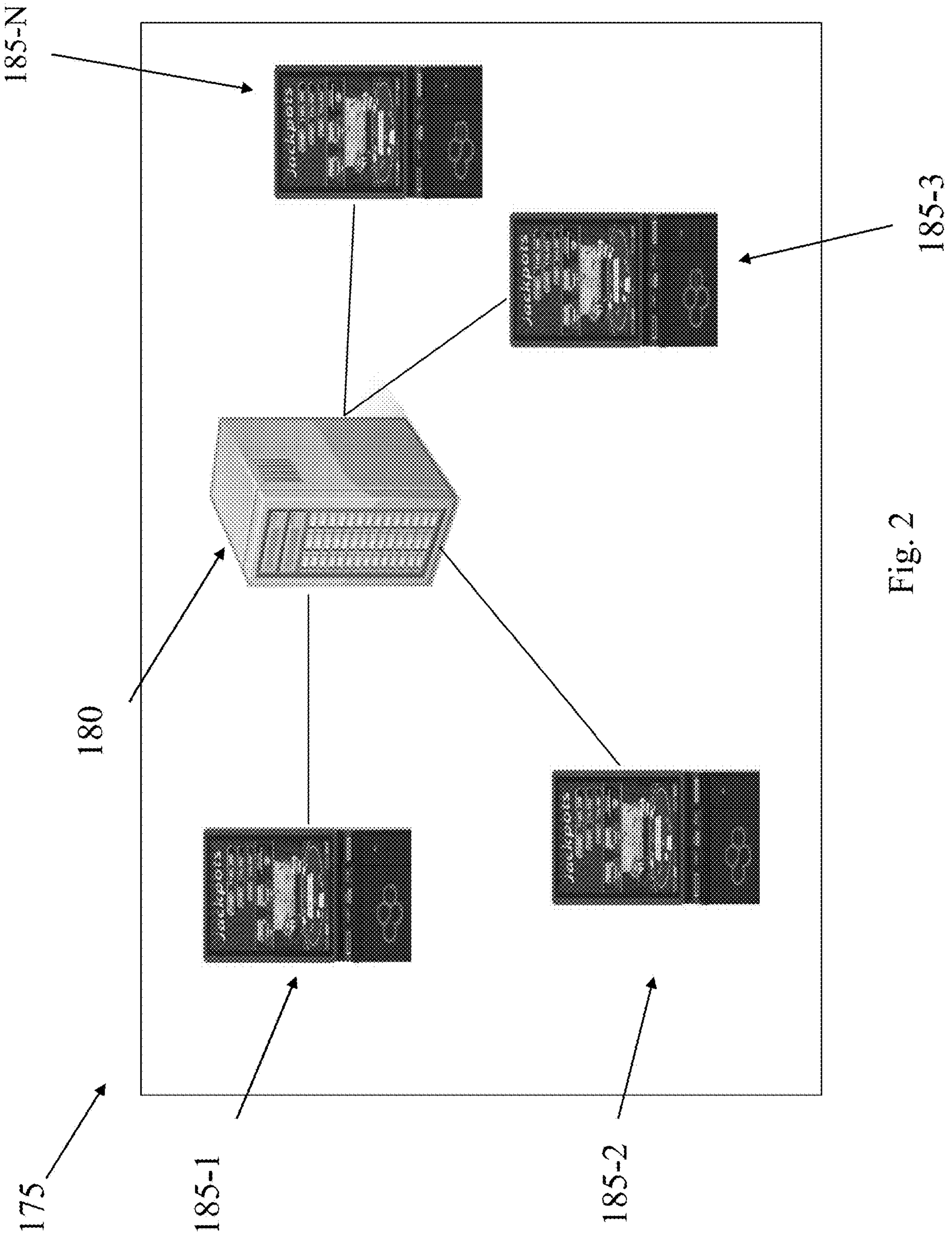
FIG. 2 illustrates a block diagram of a wireless network system including numerous slot machines according to the embodiments of the present invention.

FIG. 2 shows a block diagram of a wired system 175 which may be used to facilitate play of the game according to the embodiments of the present invention. The wired system 175 comprises a central computer 180 running a casino management system or the like and including one or more processors and memory. Standalone gaming devices 185-1 through 185-N (e.g., video machines) configured to facilitate game play.

Figure 3:
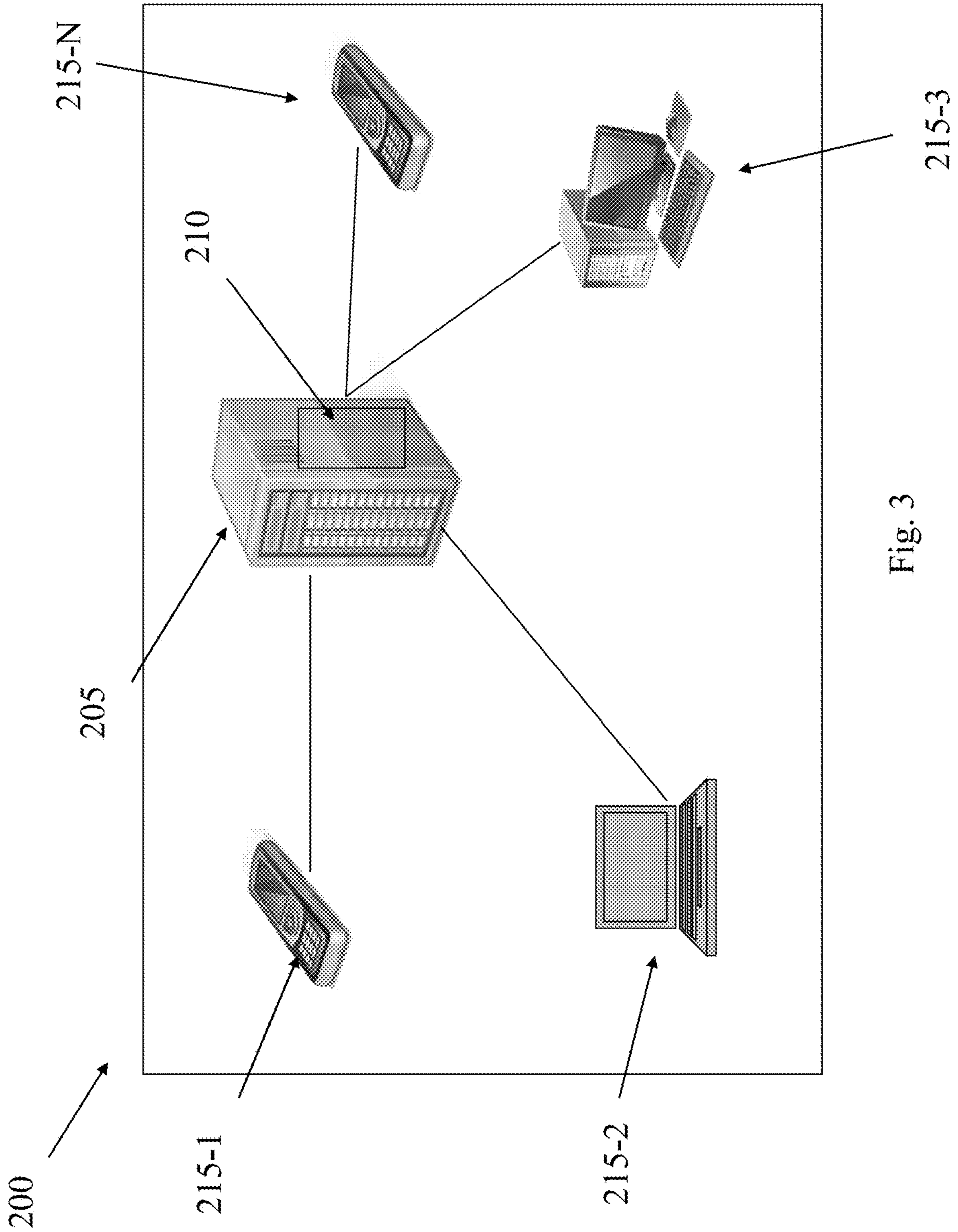
FIG. 3 illustrates a block diagram of a wireless network system accessible by mobile devices for conducting mobile games of chance according to the embodiments of the present invention.

FIG. 3 shows a block diagram of a wireless system 200 which may be used to facilitate remote play of the game according to the embodiments of the present invention. The wireless system 200 comprises a game server 205, including one or more processors 210 running game software, and remote devices 215-1 through 215-N (e.g., smart phones) configured to access said game server 205 facilitating game play on the remote devices 215-1 through 215-N. In another embodiment, the video game according to the embodiments of the present invention may be in the form of a software application ("App") downloadable onto smart phones, tablets or computers and playable via processing power and a user interface associated therewith. Wired connections may be used as well.

The embodiments of the present invention add one or more bonus hands to the conventional video poker game. As shown in the screen shot of FIG. 4A, in a first embodiment, one secondary poker hand 300 is added to the primary poker hand 305. The primary poker hand 305 is the hand played in a conventional fashion as detailed above. In other words, the player may stand pat on the first five cards displayed or discard one, two, three, four or five cards for replacement. A payout is determined based on the strength of the final poker hand. Once the primary poker hand 305 is played to completion, five cards are displayed face-up forming the secondary poker hand 300. The secondary poker hand 300 is a stud hand (i.e., no replacement cards are available). The primary poker hand 305 and secondary poker hand 300 are dealt from independent, identical decks of cards and each require a wager. The bonus hand 310 is premised on a combination of the final five cards of the primary poker hand 305 and the five cards forming the secondary poker hand 300.

Figure 4A:
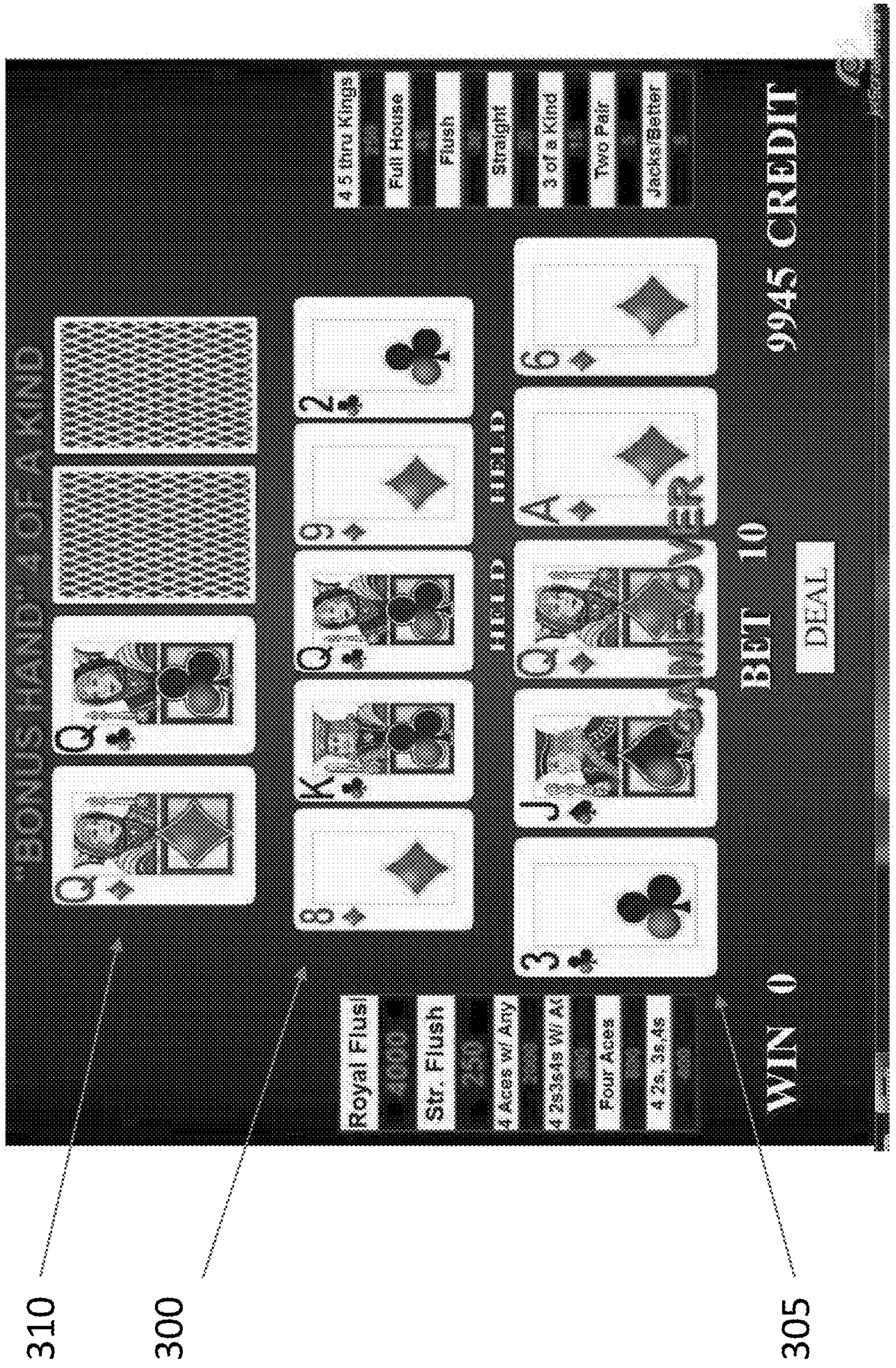
FIGS. 4A-4D illustrate screen shots of a system according to the embodiments of the present invention.
Figure 4B:
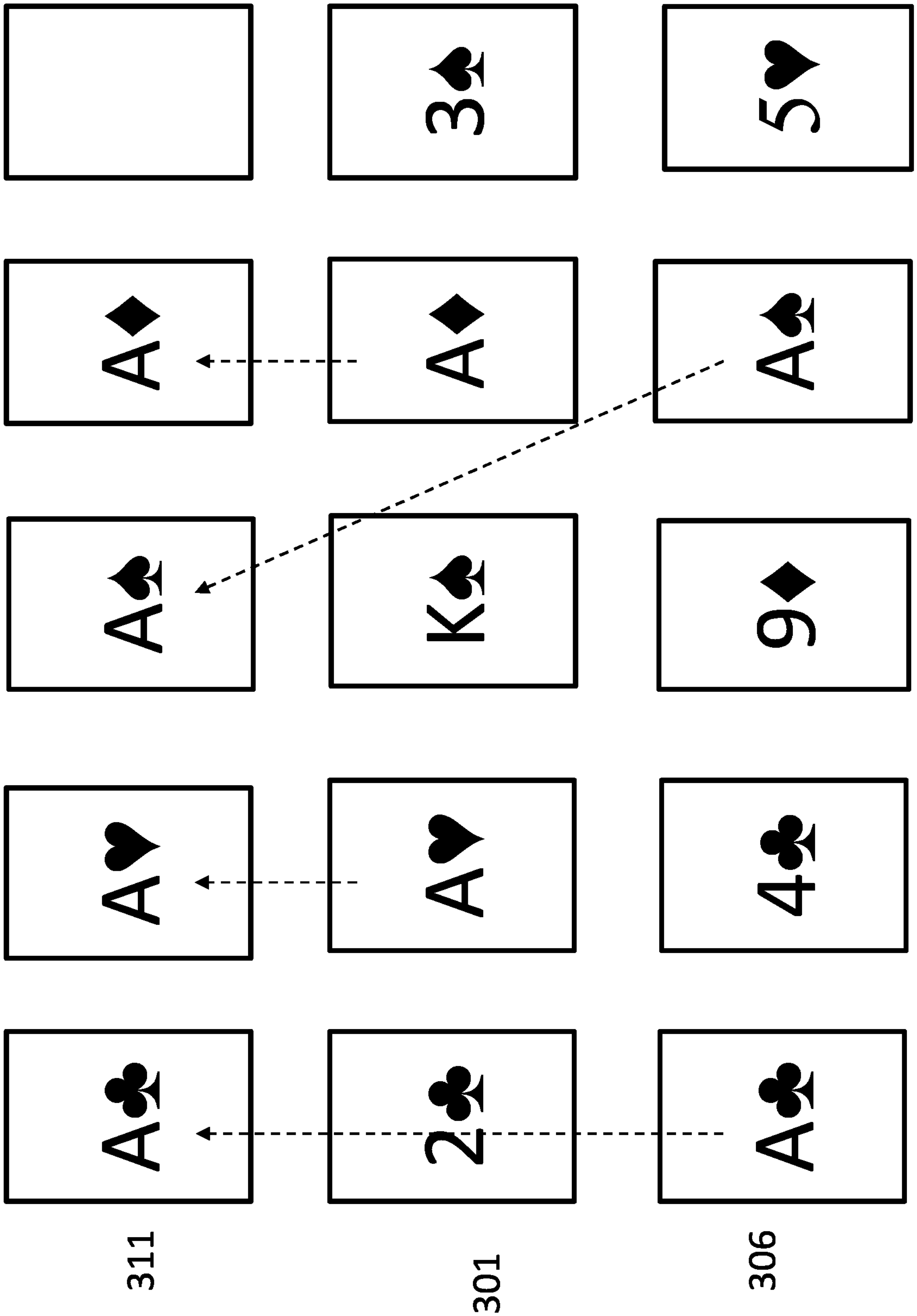

In a first embodiment, the payable bonus hand comprises 4 of a kind whereby cards from the final five cards of the primary poker hand 305 and the five cards forming the secondary poker hand 300 are combined looking to obtain a 4 of kind. As shown in FIG. 4A, the bonus hand 310 formed of the final five cards of the primary poker hand 305 and the five cards forming the secondary poker hand 300 is a pair of Queens (the Q♦ from the primary poker hand 305 and Q ♣ from the secondary hand 300.) Since the bonus hand 310 does not comprise 4 of a kind, it is a losing hand for purposes of a bonus payout. FIG. 4B shows a bonus hand 311 comprising a four of a kind formed of two Aces (A♣, A♠) from the primary hand 306 and two Aces (A♥, A♦) from the secondary hand 301. In one embodiment, the 4 of a kind must include all four suits, namely clubs, spades, diamonds and hearts. Alternatively, 4 of a kind with one or more suits repeated may result in a payout and/or 5 of a kind (which must have at least one suit repeated (see FIG. 4C secondary hand 320-2 and bonus hand 330-2 would result in a 5 of a kind hand) may also result in a bonus payout. In another embodiment, two 4s of a kind formed by the primary hand and secondary hand may result in an enhanced bonus payout. In another embodiment, two identical 4s of a kind (e.g., the primary hand and secondary hand each comprise the same 4 of a kind) may result in a bonus payout.

Figure 4C:
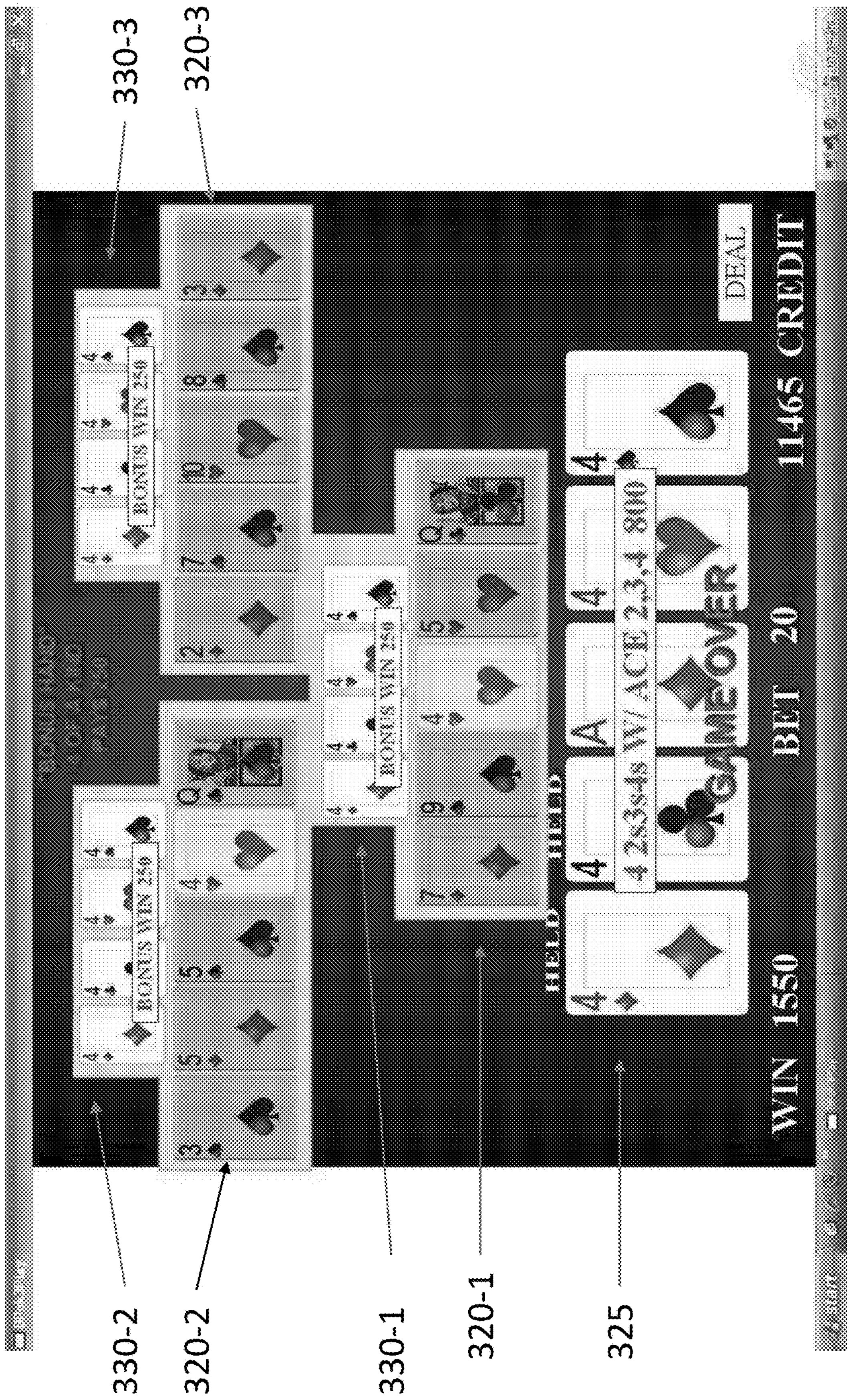

Now referring to the screen shot of FIG. 4C, in another embodiment, three secondary poker hands 320-1, 320-2 and 320-3 are presented along with the primary poker hand 325. As shown, the primary poker hand 325 comprises 4 of a kind, namely the 4♦, 4♣, 4♥ and 4♠. In such an instance, each bonus hand 330-1, 330-2 and 330-3 must also comprise a 4 of a kind as well since the bonus hands 330-1, 330-2 and 330-3 are formed from a combination of each of the secondary poker hands 320-1, 320-2 and 320-3 and the primary poker hand 325.

Figure 4D:
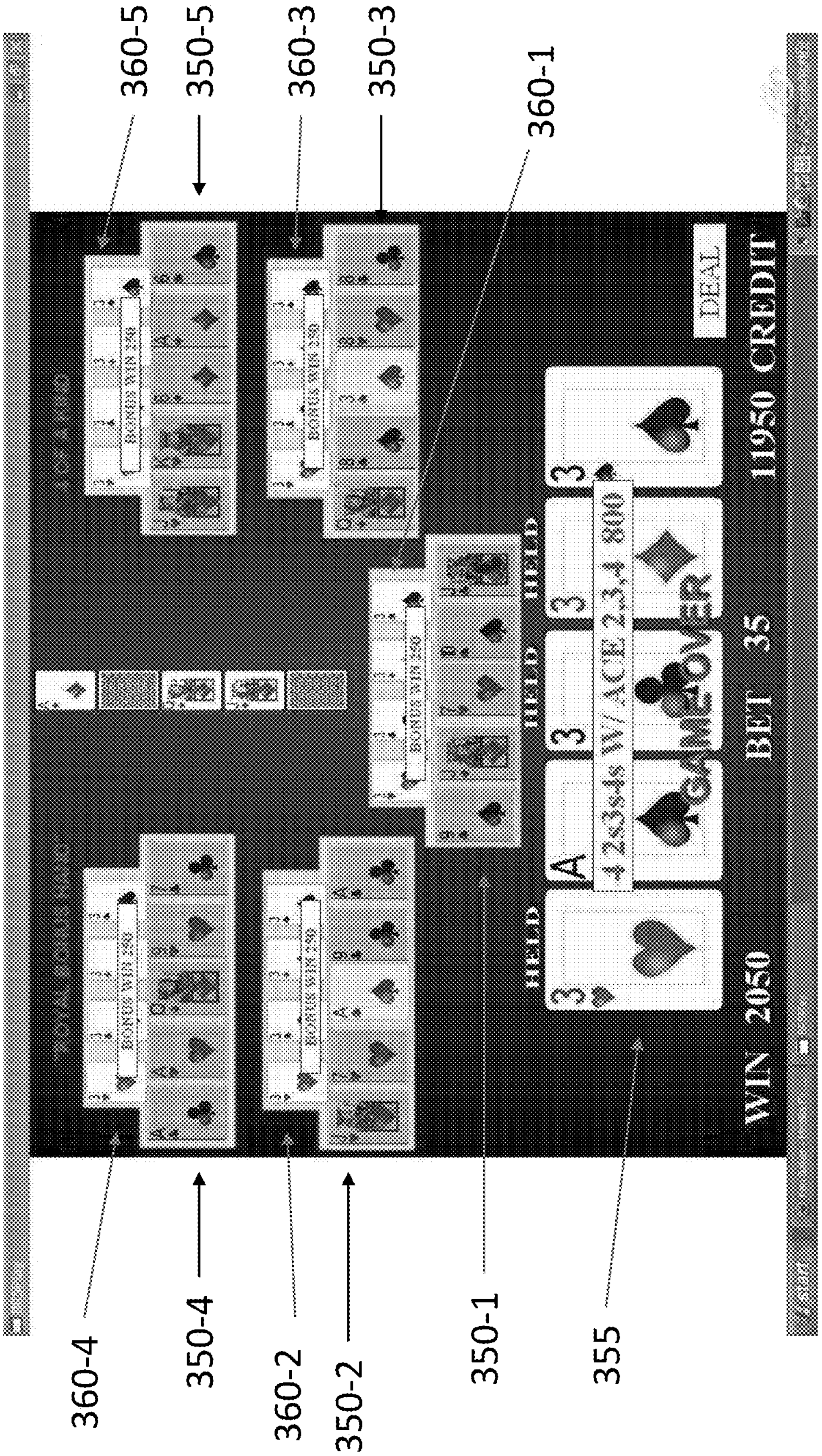

Now referring to the screen shot of FIG. 4D, in another embodiment, five secondary poker hands 350-1, 350-2, 350-3, 350-4 and 350-5 are presented along with the primary poker hand 355. As shown, the primary poker hand 355 comprises 4 of a kind, namely the 3♥, 3♣, 3♦ and 3♠. In such an instance as set forth above, each bonus hand 360-1, 360-2, 360-3, 360-4 and 360-5 must necessarily also comprise a 4 of a kind as well since the bonus hands 360-1, 360-2, 360-3, 360-4 and 360-5 are formed from a combination of each of the secondary poker hands 350-1, 350-2, 350-3, 350-4 and 350-5 and the primary poker hand 355.

Figure 5:
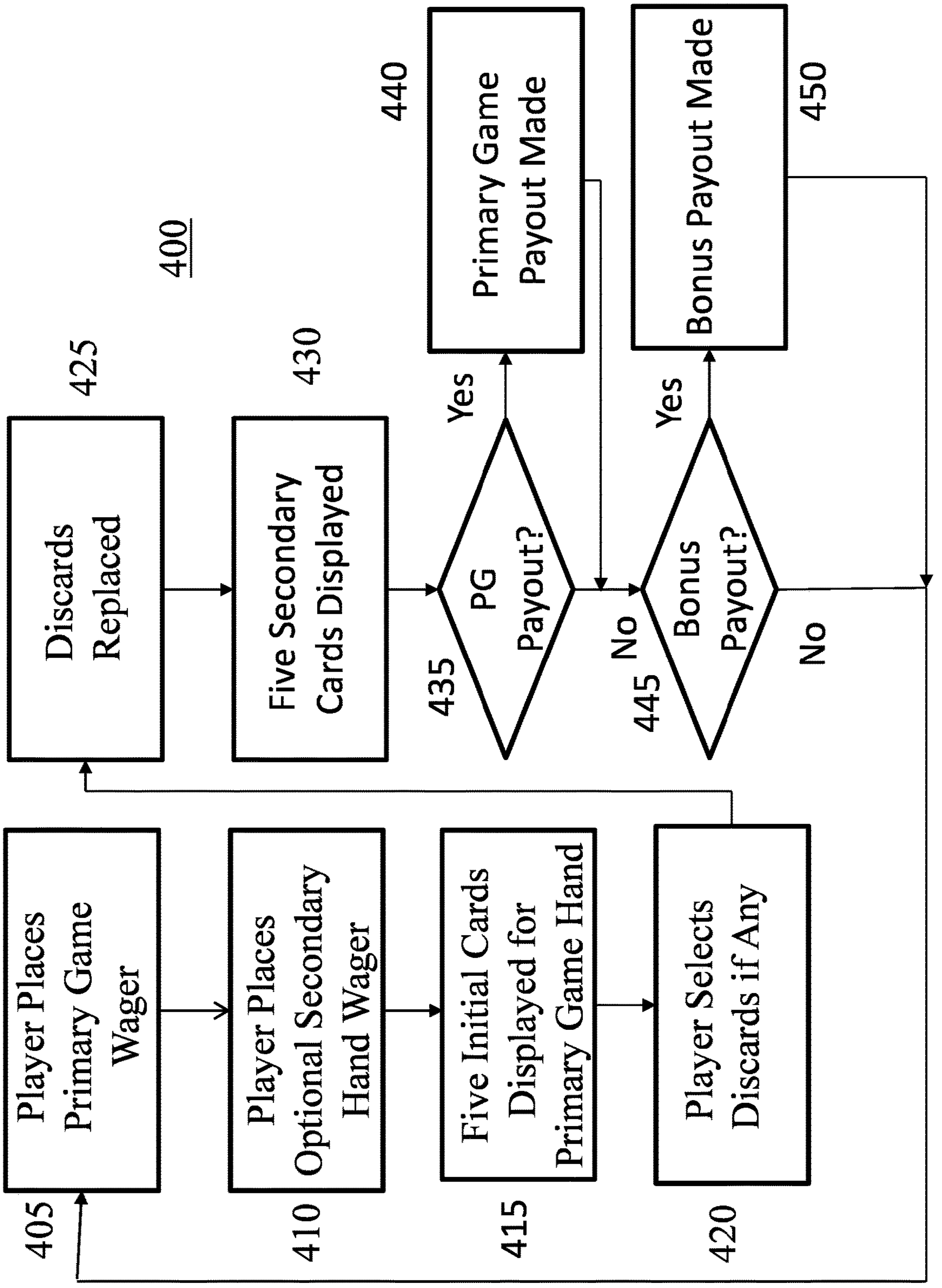
FIG. 5 illustrates a flow chart detailing game play according to the embodiments of the preset invention.

With the embodiment having five secondary hands 350-1, 350-2, 350-3, 350-4 and 350-5 and five bonus hands 360-1, 360-2, 360-3, 360-4 and 360-5, a royal flush bonus may also be implemented. A royal flush bonus hand 365 is formed using one card from each of said five secondary hands 350-1, 350-2, 350-3, 350-4 and 350-5. In order to win the royal flush bonus, one card of a royal flush must be present in each secondary hand. For example, the 10♠ in secondary hand 350-1, the Q♠ in secondary hand 350-2, the K♠ in secondary hand 350-3, the A♠ in secondary hand 350-4 and the J♠ in secondary hand 350-5 would result in the royal flush bonus. As shown in FIG. 4D, the bonus hand is not a winner as only 3 royal flush cards are present. In an alternative embodiment, more than one royal flush card may be used from a single secondary hand. 100331 FIG. 5 shows a flow chart 400 detailing one methodology associated with a game according to the embodiments of the present invention. The flow chart relates to a game with a single secondary hand and the chance at a 4 of a kind bonus. At 405, the player places the primary game wager. At 410, the player may place the optional secondary hand wager seeking the 4 of a kind bonus. For games with multiple secondary hands, the player may place a wager on one or more of the secondary hands. In one embodiment, the wagers on each secondary hand are equal to the wager on the primary game. At 415, five initial random cards from a primary deck of cards are displayed forming the primary game poker hand. At 420, the player may discard one or more of the five initial cards. At 425, any discards are replaced with new random cards from the primary deck of cards. At 430, five random cards from a secondary deck of cards are displayed forming the secondary poker hand. At 435, it is determined if the primary game (PG) poker hand results in a payout. If so, at 440, a payout related to the strength of the primary game poker hand is made. At 445, it determined if the 4 of a kind bonus hand has been achieved using the combination of the primary game poker hand and secondary poker hand. If so, at 450, the 4 of a kind bonus is paid. In one embodiment, the bonus hand payout is 50 to 1. As shown in FIGS. 4C and 4D, with multiple secondary hands and bonus hands, multiple 4 of a kind bonuses can be paid out.

Although the invention has been described in detail with reference to several embodiments, additional variations and modifications exist within the scope and spirit of the invention as described and defined in the following claims.

I claim:

1. A computer-implemented video poker gaming system comprising:

a monetary input device configured to receive a physical item associated with a monetary value;

a user interface configured to:

enable a player to select a wager for a game of chance and enable the player to initiate a cash out operation;

at least one processor running executable instructions related to a game of chance;

said at least one processor programmed to:

add said monetary value to a credit balance for said player;

deduct said selected wager from said credit balance; and decrease said credit balance in response to said cash out operation;

a display;

memory;

a bill and ticket validator configured to receive and dispense currency and/or tickets;

and wherein said processor is further running executable instructions to: (i) display an initial five random cards from a first virtual deck of fifty-two playing cards; (ii) remove discards identified by said player via said user interface; (iii) replace said discards with successive random cards from said first virtual deck of fifty-two playing cards to form a final primary poker hand; (iv) display one or more secondary poker hands formed of random cards from one or more additional separate virtual decks of fifty-two playing cards, respectively; (v) provide a payout, if warranted, based on a strength of said final primary poker hand; and (vi) provide a bonus payout based on a strength of each bonus hand formed of cards forming said final primary poker hand in combination with cards in each of said one or more secondary poker hands wherein a number of bonus hands is equivalent to a number of secondary poker hands.

2. A computer-implemented video poker gaming system comprising:

a monetary input device configured to receive a physical item associated with a monetary value;

a user interface configured to:

enable a player to select a wager for a game of chance and enable the player to initiate a cash out operation;

at least one processor running executable instructions related to a game of chance;

said at least one processor programmed to:

add said monetary value to a credit balance for said player;

deduct said selected wager from said credit balance; and decrease said credit balance in response to said cash out operation;

a display;

memory;

a bill and ticket validator configured to receive and dispense currency and/or tickets;

and wherein said processor is further running executable instructions to: (i) display an initial five random cards from a first virtual deck of fifty-two playing cards; (ii) remove discards identified by said player via said user interface; (iii) replace said discards with successive random cards from said first virtual deck of fifty-two playing cards to form a final primary poker hand; (iv) display five secondary poker hands formed of random cards from five separate additional virtual decks of fifty-two playing cards, respectively; (v) provide a payout, if warranted, based on a strength of said final primary poker hand; and (vi) provide a bonus payout based on a strength of each of five bonus hands formed of cards forming said final primary poker hand in combination with cards in each of said five secondary poker hands.

3. The computer-implemented video poker gaming system of claim 2 further comprising a royal flush bonus based on one card from each of said five secondary hands.

* * * * *